Aug. 10, 1926.

C. L. RICKENBRODE 1,595,868

MACHINE FOR SECURING HANDLES TO BASKETS

Filed Oct. 18, 1924   3 Sheets-Sheet 1

Aug. 10, 1926.  
C. L. RICKENBRODE  
1,595,868  
MACHINE FOR SECURING HANDLES TO BASKETS  
Filed Oct. 18, 1924  3 Sheets-Sheet 3

WITNESSES  
H. T. Walker

INVENTOR  
Charles L. Rickenbrode  
BY  
ATTORNEYS

Patented Aug. 10, 1926.

1,595,868

UNITED STATES PATENT OFFICE.

CHARLES L. RICKENBRODE, OF RIPLEY, NEW YORK.

MACHINE FOR SECURING HANDLES TO BASKETS.

Application filed October 18, 1924. Serial No. 744,481.

My invention relates to a machine for putting wire handles on baskets as for instance on the baskets usually employed for containing grapes.

The general object of my invention is to provide a practical and simple machine having means to support the basket and to hold the handle as well as means to cause the handle terminals to be secured to the basket adjacent the rim and clinched in position.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1:
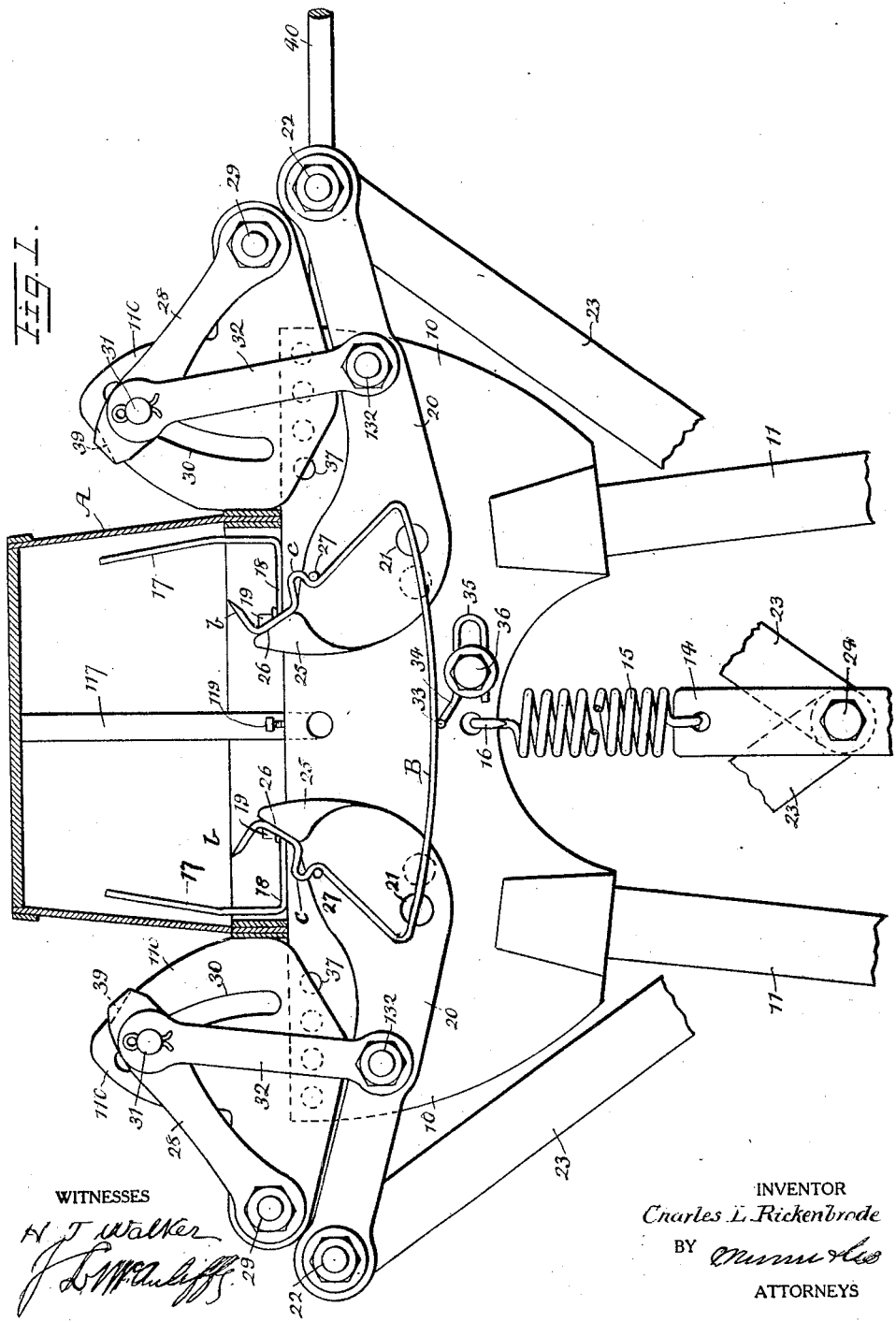
Figure 1 is a side elevation of the machine showing the basket in position in vertical section and with the handle emplaced, that is, before being secured to the basket.
Figure 2:
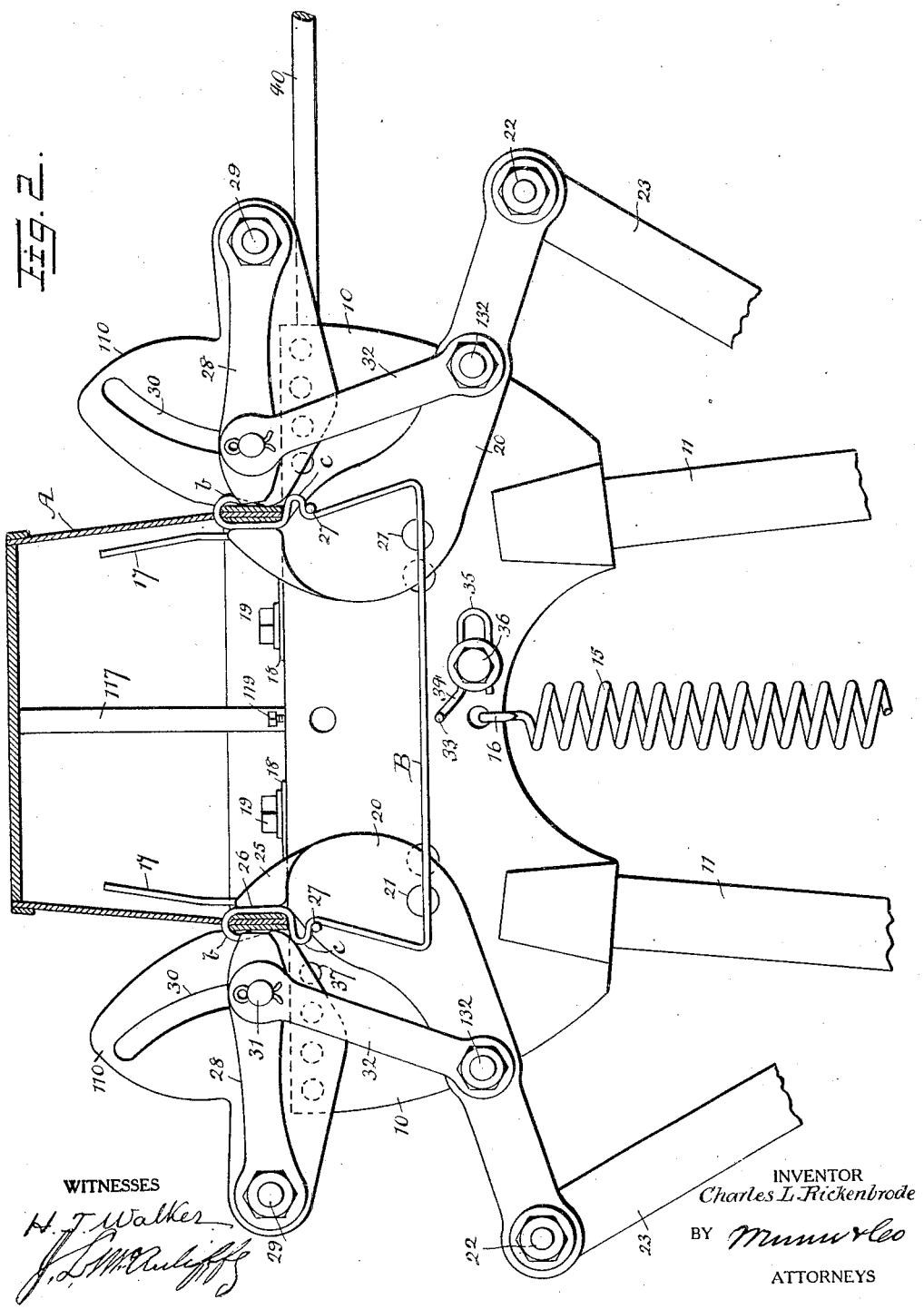
Figure 2 is a view similar to Figure 1 but with the handle in fastened position and the securing means in position occupied by them in the securing of the handle.

In carrying out my invention in accordance with the illustrated example, a suitable frame is provided, here shown as supported on legs 11 to which a treadle 12 is held by a clamp yoke 13, the treadle having a connecting rod 14 pivoted at its lower end to said treadle. The upper end of the connecting rod 14 is secured to a retractile spring 15 and secured at its opposite end as at 16 to frame 10 so that after each depression of the treadle 12 and connecting rod 14, said spring 15 will lift the connecting rod and treadle.

The basket A to which the handle at B is adapted to be secured is placed upside down on the top of the frame 10. Basket retainers are provided in the form of slightly inclined standards 17, each rising from a separate wire base 18 secured by a screw 19 so that the basket is retained in position on the top of the frame 10 and prevented by the standards 17 from displacement along said frame.

Swingable elements 20 carry the ends of the handle B to the basket A and serve to force the pointed ends b of said handle through the material of the basket from the inside to the outside where the protruding ends or spurs b of the handles are clinched through the medium of rockable clincher elements hereinafter referred to.

As the elements for securing the handle B at each side of the basket are the same, it will suffice to describe one assemblage. Each swingable element 20 is pivoted between its ends as at 21 to the frame 10 and the outer end of the element 20 is pivoted as at 22 to a link 23 which extends obliquely downward to a pivotal connection at 24 with the connecting rod 14, the arrangement being such that a depression of the treadle 12 and the connecting rod 14 will through the link 23 draw downward the outer end of the element 20 rocking the same on its pivot 21. Each swingable element 20 is disposed on the frame 10 to lie for the main part below the top of the frame 10 and therefore below the open top of the inverted basket. At its inner end the swingable element 20 is curved outwardly as at 25 and formed with a seat 26 for that portion of the handle B adjacent the pointed terminal b. Near the inner end of element 20 a lateral pin 27 is provided thereon. The relation of the seat 26 and pin 27 is such that a side member or standard of the handle B is held to the element 20 by said seat and said pin so that with a movement of the lever 20 the side of the handle B will be flexed and the pointed terminal b will be carried to the basket A at the rim and caused to pass through said rim to cause the end b to protrude at the outside of the basket.

Figure 3:
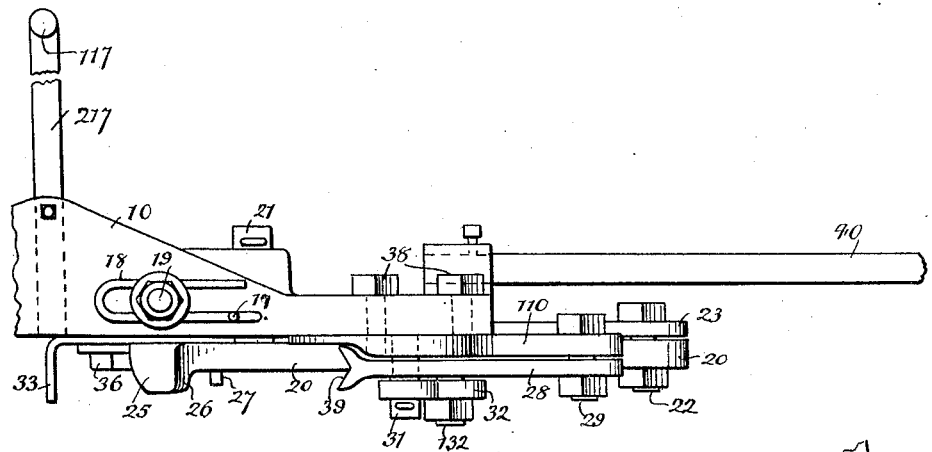
Figure 3 is a fragmentary plan view showing a portion of the machine and with the parts in the positions occupied thereby when the handle is first placed in the machine.
Figure 4:
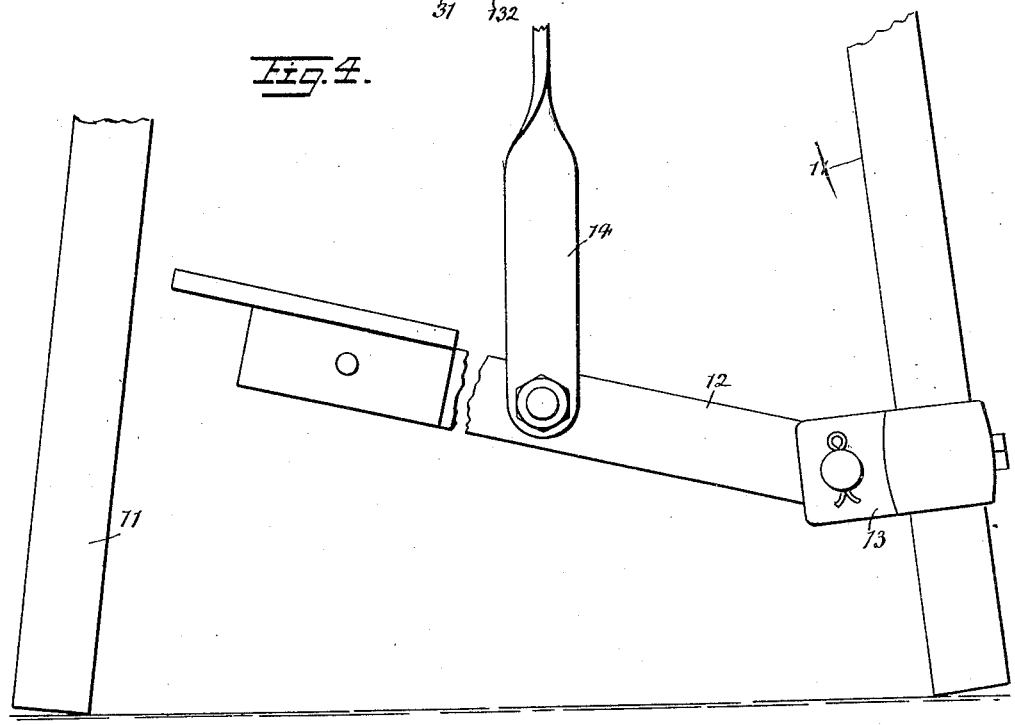
Figure 4 is an elevation of the lower portion of the machine omitted from Figures 1 and 2.

A rockable clincher element 28 is provided to coact with each swingable element 20. Said element 28 at each side of the machine is pivoted at its outer end as at 29 and normally extends obliquely upward and inward. In the example shown, the element 28 is pivoted to a frame plate 110 formed with an arcuate slot 30. A pivot pin 31 extends through the slot 30 through the rockable element 28 adjacent to the end opposite the pivot 29 and through the upper end of a link 32, the lower end of which is secured by a pivot pin or screw 132 to the element 20 between the fulcrum 21 thereof and the outer end 22. On the frame 10 at the front below the adjacent ends of the swingable elements 20, a rest member is provided for the handle B to aid in positioning the same for the action thereon of the elements 20. The rest element may consist as shown of a lateral pin 33 on an arm 34 extending from a base 35 held by a clamp screw 36 to the face of frame 10. The numeral 37 indicates holes in the frame 10 and to secure the frame member 110 to the body of the frame 10, screws 38 are employed to pass through said holes and into the frame 10. Several holes 37 are provided to permit of the adjustment of the member 110 toward or from the basket seat on said frame 10. The inner end of the clincher element 28 is formed with a notch 39 as best seen in Figure 3 to accommodate the end $b$ of handle B.

In addition to the standards 17 for retaining the basket, is provided a post 117 to be disposed at the exterior of the basket and advantageously rising above the standards 17. Said post 117 has a lateral foot 217 to enter the frame 10 and to be held by a set screw 119.

With the above described construction, in order to affix a handle B to the basket A, the basket is seated in inverted position on the frame 10 at the top with the basket retaining elements 17 at the interior thereof and the handle B is placed against the rest member 33 at the approximate center of the handle. The sides of the handle are placed in position so that adjacent the extreme ends they will rest on the seats 26 and be engaged by the pins 27. The handles are formed with outward bends $c$ a short distance from the pointed terminals $b$. With the basket and handle thus positioned, the treadle 12 is depressed, thereby carrying down the connecting rod 14 and the links 23 which will cause the outer ends of the swingable elements 20 to move downwardly, thus causing the inner curved ends 25 to move upwardly in an arc to the rim of the basket A.

The movement of the arm 25 will cause the pointed terminals $b$ of handle B to be forced through the material of the basket at the rim. The downward movement of the outer end of element 20 will through the link 32 draw down the clincher element 28 causing the same to rock on its pivot 29. The timing of the movements of the elements 20 and the clincher element 28 is such that said clincher element will be brought down and cause its inner end to wipe over and bend downwardly the projecting end $b$, said end entering the notch 39. When the clincher element 28 engages the terminal $b$ to clinch the same on the outside of the basket, the end 25 with seat 26 will act as an anvil to resist the pressure exerted by the element 28 in effecting the clinching action.

In the return stroke of the element 20 after the handle has been applied and clinched to the basket, the handle B slips from the pin 27 owing to the sides of the handle yielding to a sufficient extent to permit the element 20 and its pin 27 to free themselves from the secured handle. The numeral 40 indicates a horizontal bar to hold a plurality of handles.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:—

1. A machine for applying and securing handles to baskets and securing a frame, swingable elements mounted on said frame, said swingable elements having means thereon to engage the sides of a handle, means to operate said swingable elements to carry the sides of the handle to the basket material and cause the ends of the handle to penetrate said material, rockable clincher elements to engage the protruding ends of the handle and clinch the same, and links connecting the swingable elements with said rockable elements to actuate the latter after the terminals of the handle have been forced through the basket material.

2. A machine for applying and securing substantially U-shaped handles to baskets including a frame having a seat for an inverted basket, elements swingable on said frame and having ends disposed below the basket seat, said ends of said swingable elements having means to engage and hold the inwardly flexed arms of a handle whereby with the movement of said swingable elements the handles will be carried to the basket and the terminals of the handle forced through the basket material to protrude beyond the same at the outer side, and clincher means disposed outside the basket seating area and movable to clinch the terminals of the handle at the outer side of the basket after the terminals have been forced through the material by said swingable elements.

3. In a machine for applying and securing substantially U-shaped wire handles to baskets, means for supporting a basket in inverted position, means on which a flexed handle is adapted to be emplaced, said means including devices engaging the arms of the handle to hold the same sprung inwardly to clear the basket as the handle is moved through the open mouth of the basket, and means for moving the first means laterally to carry the arms of the handle to the basket, and force the ends of the arms through the basket.

4. In a machine for applying and securing approximately U-shaped handles to baskets, a pair of rocker arms for cooperatively supporting a handle with the arms thereof flexed inwardly, said rocker arms including anvil ends against which the extremities of the arms rest, and including intermediate their ends, securing pins for holding the handles flexed and holding the ends of the arms against the anvils, means acting on the rocker arms to cause the same to separate the ends of the handle which they hold, and force said ends from the inside outwardly through a basket.

5. A device of the class described in claim 4, and including clincher means and means connecting the clincher means to the rocker arms for causing synchronized movement of the clincher means and rocker arms to clinch the projecting ends of the handle against the anvil ends of the rocker arms.

CHARLES L. RICKENBRODE.